Nov. 19, 1968  R. L. BAILEY  3,411,387
BOTTLE PUNCTURING METHOD AND DEVICE
Original Filed June 6, 1966  2 Sheets-Sheet 1
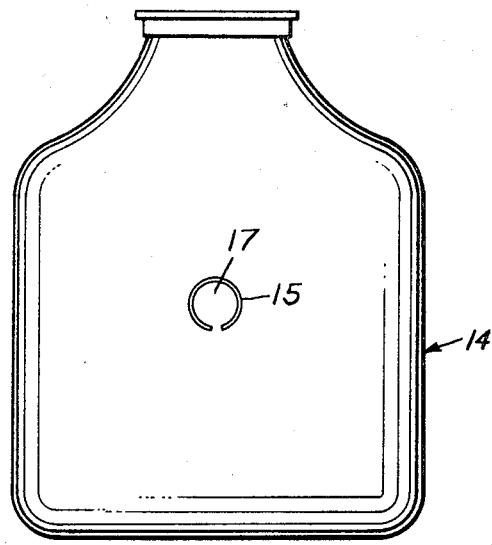
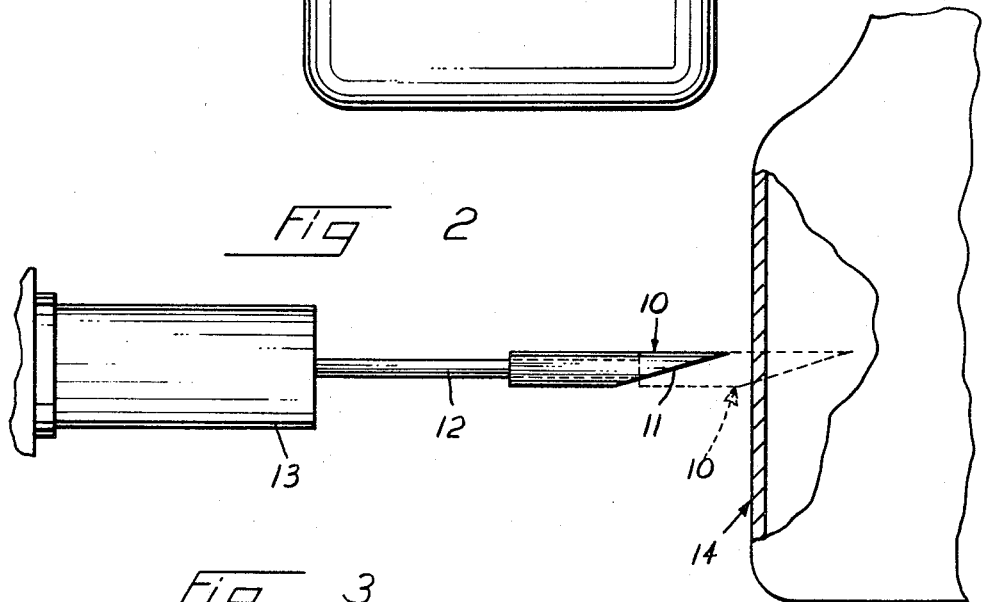
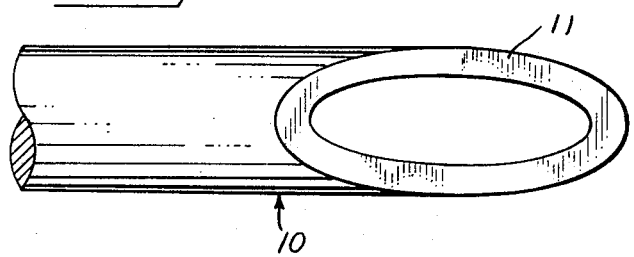
INVENTOR.
ROBERT L. BAILEY Nov. 19, 1968 R. L. BAILEY 3,411,387
BOTTLE PUNCTURING METHOD AND DEVICE
Original Filed June 6, 1966 2 Sheets-Sheet 2

INVENTOR.
ROBERT L. BAILEY

United States Patent Office 3,411,387
Patented Nov. 19, 1968

3,411,387
BOTTLE PUNCTURING METHOD AND DEVICE
Robert L. Bailey, Spokane, Wash., assignor to National Distillers and Chemical Corporation, New York, N.Y.
Original application June 6, 1966, Ser. No. 555,373. Divided and this application Oct. 18, 1967, Ser. No. 687,943
2 Claims. (Cl. 83—30)

ABSTRACT OF THE DISCLOSURE

A method of puncturing plastic bottles by the gradual introduction of an elongated sharpened instrument. The instrument first initiates a slot through the bottle wall and thereafter expands the slot in a tubular arc to define an inner flap.

---

This application is a division of application Ser. No. 555,373, filed June 6, 1966.

This invention relates to a method of puncturing plastic bottles and a device for puncturing the sides of plastic bottles. It is designed for use in conjunction with a bottle testing apparatus. The puncturing method and device is designed to disable the bottle so that it will not be subsequently filled by a vacuum operating filling machine such as those commonly used in filling bottles with milk.

The method disclosed herein provides a practical solution to the necessity of puncturing the side of a plastic bottle. It involves the gradual introduction into the bottle of an elongated sharpened instrument to produce a clean opening without breaking or shattering the plastic material.

The puncturing device disclosed herein provides an opening in the side of a plastic bottle which cannot seal or partially seal upon removal of the puncturing device from the bottle. If a more pointed ram or spike is used to puncture a plastic bottle, it will break into and pierce the side of a bottle. However, such walls of broken plastic sometimes interlock as the ram is retracted from the bottle, permitting the formation of a partial vacuum within the bottle when the bottle is placed under a vacuum operated filling machine.

It is an object of this invention to positively form an open aperture at the side of a plastic bottle to prevent later establishment of a partial vacuum within the bottle.

Another object of this invention is to provide a device of this sort that can operate quickly and efficiently, and which will require little maintenance during its use.

Another object of this invention is to provide such a device which can effectively produce a hole at the side of a plastic bottle without striking the bottle with such force as to deform the remainder of the bottle configuration.

These and further objects will be evident from the following disclosure, taken together with the accompanying drawings which illustrate a preferred form of the invention. Technical modification of the structural features of the device is possible and the invention itself is not intended to be limited by reference to the drawings or following disclosure alone.

In the drawings:

FIGURE 1 is a side view of a plastic bottle having an aperture as formed by the described device;

FIGURE 2 is a side elevation view showing the puncturing device of this invention and the operation of the device in puncturing a bottle;

FIGURE 3 is an enlarged bottom view of the top of the puncturing device as shown in FIGURE 2;

Figure 4:
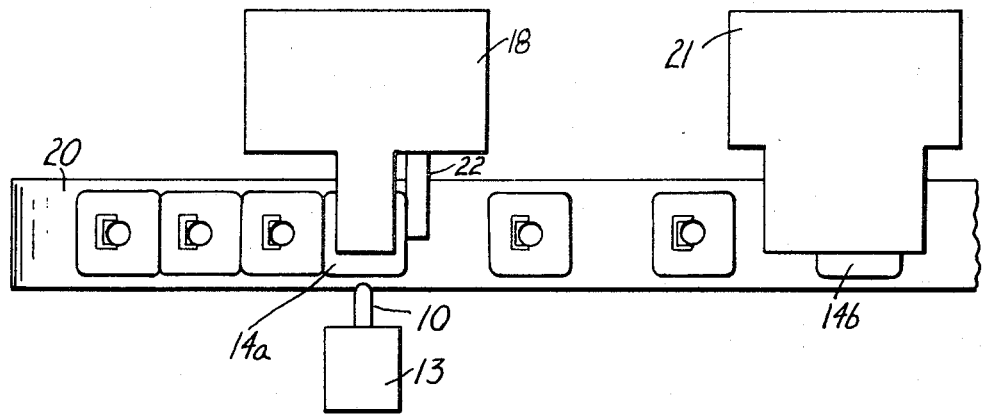
FIGURE 4 is a schematic view illustrating the use of the bottle puncturing method and device in a dairy operation.

The bottle puncturing device described herein is designed for use in conjunction with a detector for testing plastic bottles or jugs to detect the presence of contaminants. Such an apparatus is described generally in my co-pending patent application Ser. No. 373,310, filed June 8, 1964 for Noxious Odor Detector. The apparatus disclosed therein is used to check plastic jugs or bottles designed for re-use as milk containers. If the odor of an organic contaminant is detected within the bottle, it must be rendered unusable. The testing apparatus is used to provide an electrical impulse to a solenoid operated valve or other device for controlling a reciprocating cylinder on which is mounted the puncturing device of this invention.

Merely puncturing a bottle by a sharpened spike or ram printed at one end has been found to be insufficient for the desired purposes. The yieldable walls of the plastic container are sometimes drawn back outwardly with the tracing tool, causing the aperture to be partly resealed. Since the destruction of the bottle in this manner operates on the presumption that an aperture in the bottle will prevent the bottle from being filled on automatic liquid filling machine which seal the top of the bottle and draw liquid into the bottle by exerting a vacuum within the bottle, partial resealing of the aperture is objectionable. It can result in undesirable bottles being filled, leakage of liquid through partially sealed apertures, and waste of the product with which the containers are being filled.

The method of puncturing bottles without shattering or breaking of the plastic materials involves the insertion into the bottle of an instrument having an elongated cutting edge formed about a tubular cross section. By gradually widening the opening and forming its edges back upon itself, a clean open flap or aperture is assured.

The tool shown in the drawing provides a rather simple solution to this problem. Rather than a spike or pointed tool, an oblique tubular knife 10 is used. The knife 10 is simply a length of tubular material, preferably hardened steel, having a cutting edge 11 which lies in a plane that forms an acute angle relative to the longitudinal axis of tool 10. The tool 10 is mounted on the pistol rod 12 of a power cylinder 13 on the framework of the apparatus. Reciprocation of rod 12 results in movement of tool 10 between the retracted position shown in full lines in FIGURE 2 and the puncturing position shown in dashed lines.

The container 14 after being punctured, has an aperture 15 formed complementary to the configuration of the circular tool 10. If the cutting edge 11 is not fully inserted within the container, the aperture will surround a cut flap 17, which will have a smooth circular outer peripheral edge that will not frictionally grasp the adjacent cut edge of the container. A vacuum pressure will not be sustained within the container due to the free opening provided by the aperture.

One advantage of this tool is that by providing a sharp oblique cutting edge, the edge 11 penetrates the container wall without deforming the container, so that the container is not shattered or bent, but is clearly punctured along one wall. There is no danger of the bottle conveyor being jammed by a deformed container, as is the case with other types of destruction devices.

Other cross sectional shapes could be used in the tool 11, although the circular shape illustrated has been found to be both structurally simple and effective. The long oblique nature of edge 11 insures long life to the tool and smooth penetration thereof into the container interior.

The edge 11 can be formed in a single plane or can be slightly concave, leading forwardly to an edge that is coincident with the outside surfaces of the tool 10.

Figure 5:
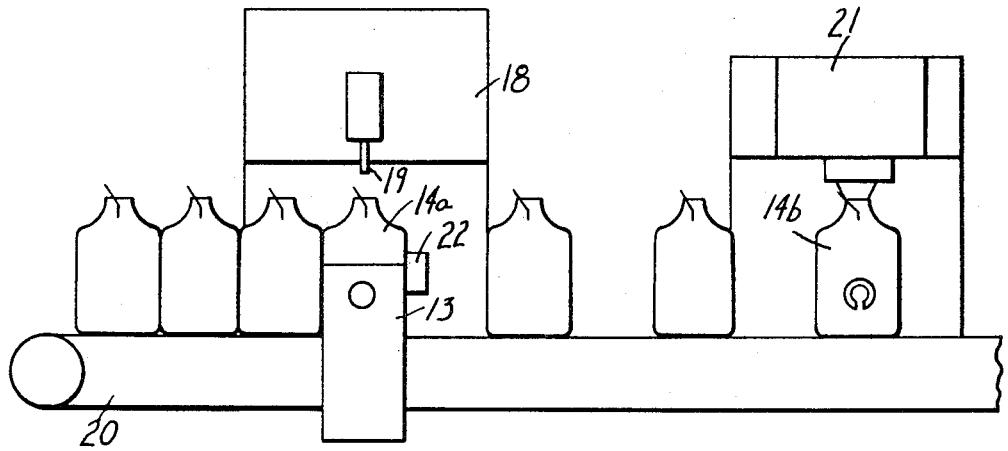
FIGURE 5 is a schematic elevational view of the apparatus illustrated in FIGURE 4.

FIGURES 4 and 5 illustrate schematically the use of the method of puncturing plastic bottles and the apparatus described above. The puncturing apparatus is used in conjunction with an organic vapor detection or sensing unit 18. The unit 18 is mounted alongside a bottle conveyor 20 leading from a bottle washer (not shown) past the sending unit 18 and to a filling apparatus 19. As mentioned above, an example of the sensing unit 18 is illustrated and described in patent application Ser. No. 373,310. For purposes of the present discussion, it is sufficient to understand that it includes a detection cell which is activated by the presence of organic vapors or contaminants in gas drawn from a plastic bottle through a tube 19 insertable within each bottle as it is being tested. The bottle being tested is temporarily held stationary by a movable stop mechanism generally shown at 22. The cylinder 13 is mounted adjacent to the detection unit 18 with the puncturing tool 10 aligned in such fashion that its line of travel relative to cylinder 13 intersects the bottle 14a being tested by the detection unit 18.

The filling machine 21 conventionally used by dairies in filling jugs or bottles with milk, is vacuum actuated. The machine 21 seals the top of each bottle 14b positioned for filling purposes. A vacuum is then established in the bottle 14b, this vacuum being used to draw milk from the filling machine 21 into the bottle or jug 14b. However, if the presence of an organic vapor has been detected by the detector unit 18 and the tool 10 has been used to puncture the bottle 14b as shown in FIGURE 5, no vacuum will be established within the bottle 14b and it will continue along the bottle conveyor unfilled. In this manner, the operation of the detector unit 18 in activating the tool 10 automatically prevents filling of the rejected bottles by the filling apparatus 21. Since it is extremely important that rejected bottles remain unfilled and that partial filling of such bottles be eliminated since this is wasteful of the milk product, the importance of properly puncturing each bottle so that a vacuum cannot be established within it is not to be underestimated. Any puncturing device which does not positively prevent the filling machine 21 from operating in conjunction with a rejected bottle is not acceptable in actual dairy practice.

Minor modifications can be made in the details of the tool or in the manner in which it is mounted and used on the actuating cylinder assembly. For these reasons, the invention described above is to be limited only by the following claims.

I claim:
1. A method of puncturing the wall of a plastic bottle by initiating a slot protruding through the wall and expanding the slot outwardly in a tubular arc to define an inner flap bounded by the walls of the slot.

2. A method of preventing the filling of plastic containers by vacuum filling apparatus comprising:
puncturing the wall of a container by initiating a slot extending through the container wall and subsequently expanding the slot outwardly in an arc directed back upon itself to thereby define an inner flap bounded by the walls of the slot.

References Cited
UNITED STATES PATENTS 3,120,143  2/1964  Kreider _____ 83—54 X

FOREIGN PATENTS 1,321,497  2/1963  France.

JAMES M. MEISTER, *Primary Examiner.*